Sept. 1, 1953         R. M. KINGMAN         2,650,415
TERMINAL CARD MANUFACTURING MACHINE
Filed Nov. 27, 1948                      6 Sheets-Sheet 1

INVENTOR
Rufus M. Kingman
BY
ATTORNEYS

Sept. 1, 1953  R. M. KINGMAN  2,650,415
TERMINAL CARD MANUFACTURING MACHINE
Filed Nov. 27, 1948  6 Sheets-Sheet 2

FIG_2_

FIG_5_

INVENTOR.
Rufus M. Kingman
BY
ATTORNEYS

Sept. 1, 1953

R. M. KINGMAN 2,650,415

TERMINAL CARD MANUFACTURING MACHINE

Filed Nov. 27, 1948

INVENTOR
R. M. Kingman
BY
Fletcher E. Swain
ATTORNEYS

FIG_7_

FIG_6_

INVENTOR
Rufus M. Kingman
BY
Fletcher & Swain
ATTORNEYS

Sept. 1, 1953           R. M. KINGMAN           2,650,415

TERMINAL CARD MANUFACTURING MACHINE

Filed Nov. 27, 1948           6 Sheets-Sheet 5

INVENTOR
*Rufus M. Kingman*
BY

ATTORNEYS

Sept. 1, 1953 R. M. KINGMAN 2,650,415
TERMINAL CARD MANUFACTURING MACHINE
Filed Nov. 27, 1948 6 Sheets-Sheet 6

FIG_14_

FIG_15_

FIG_16_

FIG_17_

FIG_18_

FIG_19_

INVENTOR
Rufus M. Kingman
BY
ATTORNEYS

Patented Sept. 1, 1953

2,650,415

UNITED STATES PATENT OFFICE 2,650,415

TERMINAL CARD MANUFACTURING MACHINE

Rufus M. Kingman, Palo Alto, Calif., assignor to Hewlett-Packard Company, Palo Alto, Calif., a corporation of California Application November 27, 1948, Serial No. 62,268

8 Claims. (Cl. 29—33)

1

This invention relates generally to machines and methods for the manufacture of so-called terminal cards, and to products produced by the same.

In the manufacture and assembly of electronic and other electrical equipment, it is common to use so-called terminal cards for the mounting of electrical resistors. Such a card consists of a strip of suitable insulating material, such as a phenolic condensate product, which serves to mount a plurality of regularly spaced metal posts to which the terminals of such devices as small resistors, condensers, potentiometers, wires and other components used in instruments and radio gear can be attached by soldering. In the past such cards have been manufactured by machines and methods involving the individual handling and attachment of the various posts to the card. In some instances the posts have been manufactured by the use of automatic screw machines, while in other instances they are made by punching from a metal sheet or ribbon. In general the procedure and equipment required for manufacture of the cards involves considerable labor, which greatly increases the cost of manufacture. Also the construction of such cards has been such that considerable labor is involved in attaching and soldering terminal wires of condensers and resistors to the same, thus increasing the cost of assembly operations in which the cards are used.

It is an object of the present invention to provide a new machine and method of the above character capable of manufacturing terminal cards at a minimum of labor and cost.

It is another object of the invention to provide a machine and method of the above character which carries out its essential operations automatically.

Another object of the invention is to provide a machine and method of the above character in which the posts are formed successively and automatically from a metal ribbon, and are introduced and secured to the cards in synchronism with the post forming operations.

It is another object of the invention to provide a machine of the above character which can be operated by inexperienced and unskilled labor, and which will be free from industrial hazards.

Another object of the invention is to provide a new type of terminal card construction which will greatly facilitate the attachment of resistors and condensers to the same.

Further objects of the invention will appear

2 from the following description in which the preferred embodiment has been set forth in detail in conjunction with the accompanying drawing.

Referring to the drawing.

In general the invention in its preferred form provides a carriage for holding a blank card to which posts are to be applied. The carriage serves to feed the card step-by-step into the machine, and in synchronism with such movements, punching means applies holes in the card for receiving the posts. A punch and die mechanism is operated in synchronism with the feeding of the card, and serves to successively form posts from a continuous metal tape or ribbon. The ribbon is fed forwardly step-by-step, and as the posts are formed they are forced into the holes of the card. A part of each post extends beyond the back side of the card, and is crimped and upset. It is desirable to provide supplemental punching means for providing mounting openings in the end corners of the card. All of the essential operations of the machine are carried out according to an automatic cycle which is initiated by manual closing of a switch.

Figure 1:
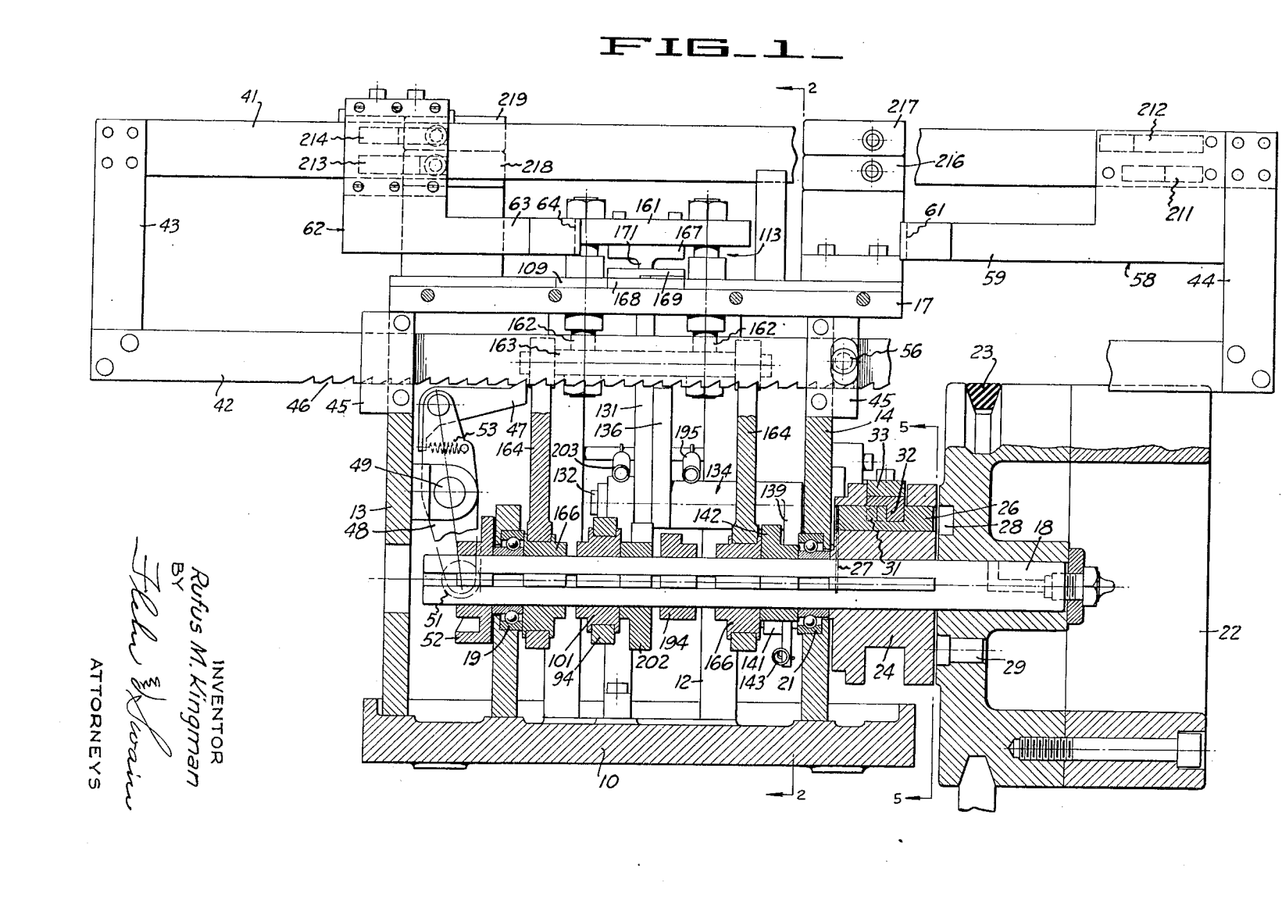
Figure 1 is a front elevational view of the machine, partly in section, and illustrating particularly the feed carriage, and certain of the actuating means. (Note that this view is taken along the line 1—1 of Figure 2.)
Figure 2:
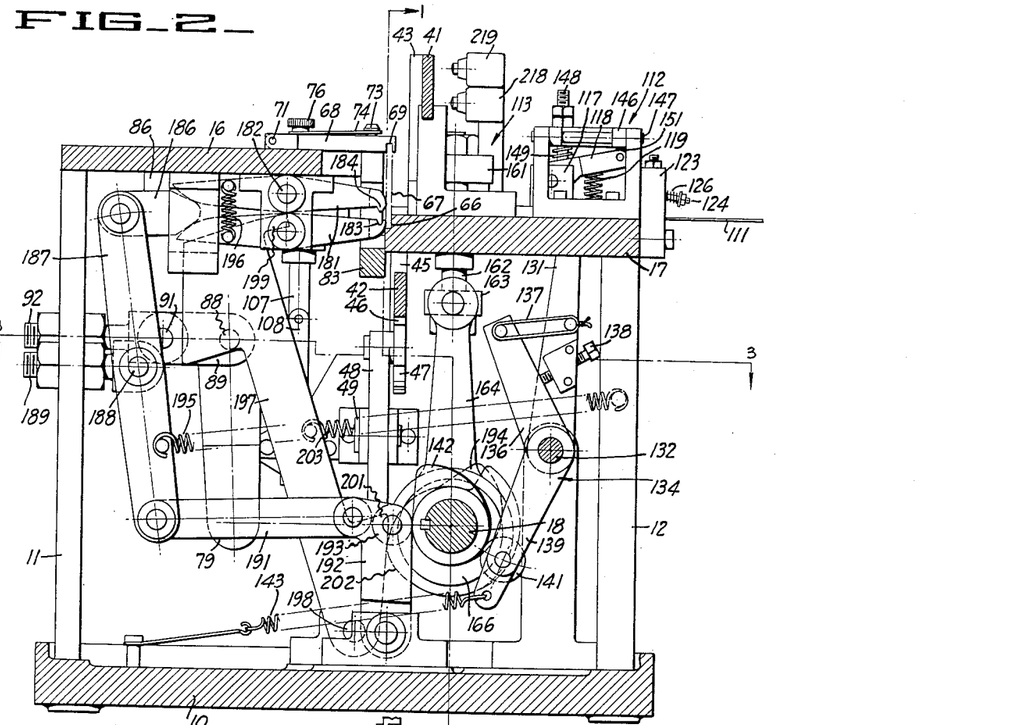
Figure 2 is a cross-sectional view taken along the line 2—2 of Figure 1.

Referring to Figures 1 and 2 of the drawing, the machine as illustrated consists of a suitable base plate 10 which serves to mount the front and back vertical members 11 and 12, and also the end support members 13 and 14 (Figure 1). The top horizontal plates 16 and 17 are carried by the vertical members 11 to 14 inclusive. The parts just mentioned form a frame for the machine which serves to carry all of the working parts. A main rotatable shaft 18 extends through the frame, and is supported by the bearing assemblies 19 and 21. Various cams and eccentrics are mounted upon the shaft 18, and which will be presently described in detail. A fly wheel 22 is journaled on one end of the shaft 18 (Figure 1), and is driven by suitable means such as a V-belt 23, which extends to a suitable electric motor (not shown).

Figure 5:
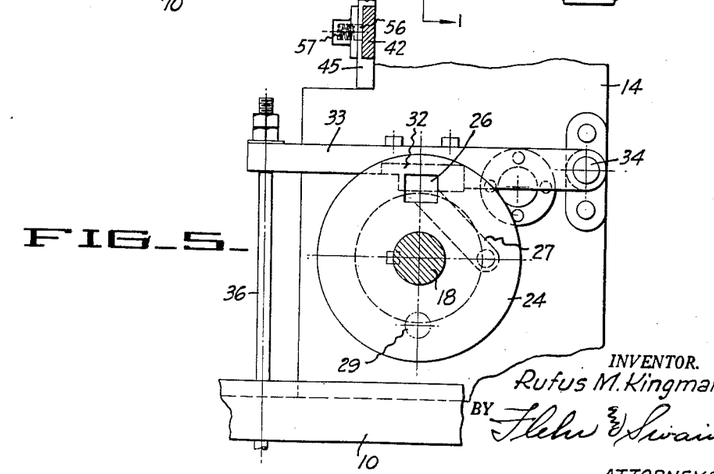
Figure 5 is a cross-sectional detail taken along the line 5—5 of Figure 1, and showing the construction of the drive clutch.

One revolution clutching means is provided for establishing a drive connection between the fly wheel 22 and the shaft 18, and includes a clutch collar 24 (Figure 1), which is splined to the shaft 18. A lug 26 is mounted within collar 24, and is adapted to slide a limited distance in a direction longitudinally of the shaft 18. Normally this lug is urged to the right by the leaf spring 27 (Figure 5). In Figure 1 it is shown in disengaged position. When moved to the right of the position illustrated in Figure 1, the right hand end of the lug is received within an annular recess 28 formed in the adjacent face of the fly wheel 22. The recess 28 is interrupted by a hardened lug or pin 29. Therefore when the lug 26 is moved by the spring 27 to an engaged position within the recess 28, it engages the pin 29, whereby the shaft 18 is driven. The lug 26 is provided with an inclined cam or shoulder 31, adapted to be engaged by a complementary cam shoulder 32, carried by the clutch trip lever 33. One end of the lever 33 has a pivotal attachment 34 to the frame of the machine, and the other end is attached to the operating rod 36 of a suitable solenoid (not shown). When lever 33 is raised from the position illustrated in Figure 5, lug 26 is released to enable it to move to engaged position. Assuming however that immediately after such actuation the lever 33 is permitted to return to its normal position, upon completing one revolution the cam shoulders 31 and 32 engage to automatically retract the lug 26. The cooperating parts 26 and 33 are so formed that when cam shoulders 31 and 32 engage to retract the clutch lug 26, abutment shoulders come into positive engagement to positively stop the shaft 18 in a definite predetermined position. Spring urged cam means (to be later described) associated with the shaft 18 prevents back rotation after each stoppage.

The carriage means to which a blank card is applied consists in this instance of the upper and lower parallel bars 41 and 42 (Figure 1) which are rigidly connected at their ends by the connecting bars 43 and 44. When the machine is operated this carriage is fed step-by-step laterally of the machine, whereby the blank card is shifted by predetermined increments to receive the formed posts. The lower bar is guided for horizontal sliding movement in the guide blocks 45, which are secured to the frame.

To provide feed means for the carriage, the lower edge of the bar 42 is provided with the ratchet teeth 46, which are engaged by the pawl 47. Pawl 47 has a pivotal mounting on a lever 48, which is pivoted at 49, and which has its lower end provided with a cam roller 51. This roller engages the side face of the cam 52 which in turn is attached to the shaft 18. The pawl 47 is normally urged toward engaged position by spring 53. It may be temporarily disengaged however to permit free shifting of the carriage, by means to be presently described. A suitable friction device is provided for the purpose of facilitating proper feeding action of the pawl 47. This device can consist of a simple friction plunger 56 in one of the blocks 45 and which is frictionally urged against one side of the bar 42 by spring 57.

The carriage is constructed to take cards of varying lengths to which posts are to be applied. At the right hand end of the carriage as viewed in Figure 1, a bracket 58 is atached to the adjacent end of bar 41, and is provided with an extension 59, the extremity of which is provided with a card receiving groove 61. Another bracket 62 is adjustably secured to the bar 41, and is provided with an extension 63, the extremity of which has a card receiving groove 64. When a rectangular card blank is inserted in the carriage with its ends within the grooves 61 and 64, its lower edge is accommodated in the recess 66 formed in the plate 17 (Figure 2) so that as the carriage moves step-by-step the card is likewise moved through the machine. In Figure 2 a card blank 67 is shown in the machine, with its lower edge in the recess 66.

In addition to the parts just described it is desirable to provide a retaining plate 68 which is provided with a groove 69 to accommodate the upper edge portion of the card 67 (Figure 2). This plate has pivotal mountings at 71 and 72 to the top plate 16, so that it can be swung upwardly to an out-of-the-way position to permit the removal or insertion of the card 67. In order to hold the plate 68 in its card engaging position during operation of the machine, it is desirable to provide suitable locking means such as a lock pin 73 which is carried by the frame, and which is accommodated within an aperture in the plate 68. The upper enlarged end of pin 73 is engaged by the sloted end of a locking finger 74, which is pivotally attached to the plate 69 and which can be swung by turning the knob 76.

Figure 6:
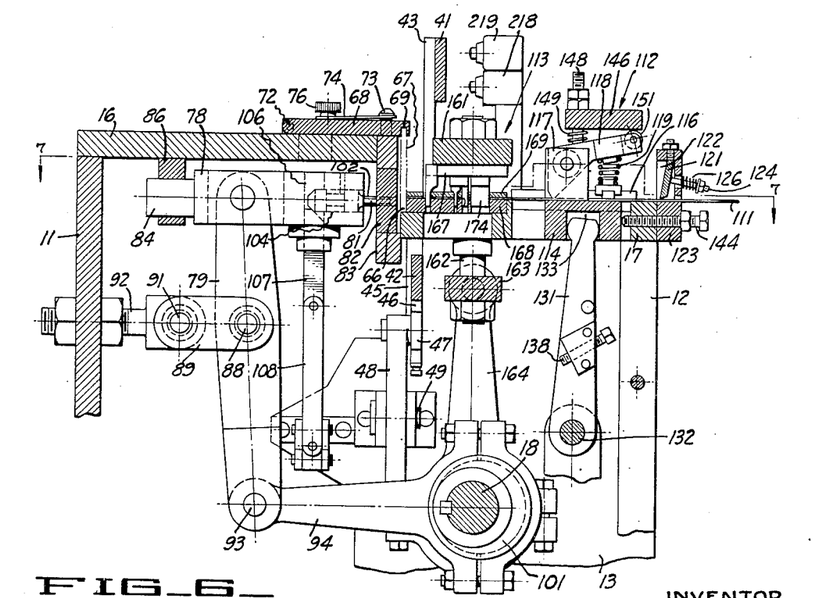
Figure 6 is a cross-sectional view taken along the line 6—6 of Figure 3.
Figure 7:
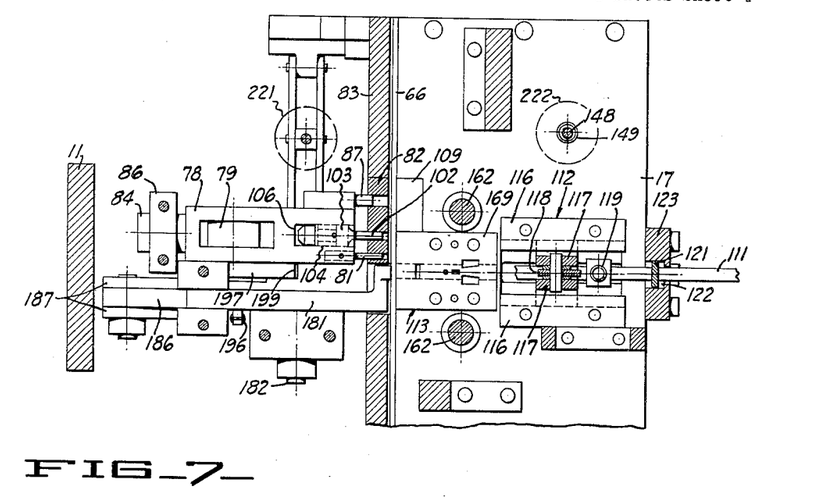
Figure 7 is a cross-sectional view of the machine taken along the line 7—7 of Figure 6.

While it is possible to construct my machine to utilize prepunched cards, it is desirable to provide the machine with suitable punching devices whereby the holes are formed for receiving the posts, simultaneously with other operations of the machine. The punching means in this instance consists of a reciprocating head 78 which is connected to the upper arm of a fulcrumed operating lever 79 (Figures 6 and 7). The head 78 carries a replaceable punch 81, which operates within the stripper block 82 (Figure 7). Block 82 is mounted in a plate 83, which is attached to the top horizontal plate 16, and which extends vertically and alongside the path of movement of the card 67. The head 78 is guided by suitable means including the rear extension 84, which is slidably retained by the stationary block 86, and a guide pin 87 (Figure 7) which is slidably retained by the stripper block 82.

Lever 79 is fulcrumed at 88 to a pair of links 89, which in turn are pivoted at 91 to the adjustable screw support 92. The lower end of lever 79 is pivotally attached at 93 to an eccentric arm 94, which in turn is journaled to eccentric 101 on shaft 18.

The supplemental punching means includes a punch 102 carried by the enlarged head 103, with the latter being slidably accommodated in the opening 104 provided in the head 78. The head 78 is also provided with an opening 106 which extends laterally to the opening 104, and which serves to accommodate the upper end of a finger 107. The rear end of the member 103, and also the upper end of finger 107, have cooperating cam faces, whereby when the finger 107 is elevated the punch 102 is moved to a projected card engaging position. However, when the finger 107 is in its lower disengaged position, illustrated in Figure 6, then the punch 102 is not retained in a projected position, and reciprocation of the head 78 does not cause the punch to engage the card. Finger 107 is attached to an operating link 108, which in turn is attached to a solenoid, as will be presently described. A die 109 is mounted upon plate 17, in cooperative relation with both the punches 81 and 102. Operation of the punches through reciprocation of the head 78 is in synchronism with the feed movements of the carriage, whereby the punches are advanced to the blank card when the card is at rest, and between advancing movements of the carriage.

As previously mentioned, means is provided for continuously forming posts from a length of metal ribbon stock. In Figures 6 and 7 the metal ribbon stock 111 is shown being supplied to the machine from a suitable spool or reel (not shown). As it enters the machine the feed ribbon is first engaged by feed means designated generally at 112, and it is then passed through the punch and die assembly designated generally at 113. The feed means consists of a member 114 which is slidably retained by the parallel guides 116, and which is adapted to be reciprocated in a plane at right angles to the plane of the card 67. A pair of upstanding lugs 117, which are mounted on member 114, form a guideway for the ribbon 111. Lugs 117 also serve to pivotally mount a ribbon engaging dog 118, which is urged toward ribbon engaging position by the compression spring 119. Back movement of the tape 111 is prevented by a second dog 121, which is loosely retained within a recess 122 formed in the block 123. A pin 124 is attached to dog 121, and a compression spring 126 carried by pin 124 serves to urge the dog 121 toward ribbon engaging position (Figure 6).

The operating means for the head 114 consists in this instance of an arm 131 pivotally attached to the frame of the machine at 132, and having its upper ball shaped end accommodated in the recess 133 of the member 114. Arm 131 is operated by a lever 134 (Figure 2), having one arm 136 which is operatively attached to the arm 131 by the wire loop 137 which is normally tensioned by the set screw 138. This arrangement causes breakage of a readily repairable part, that is the wire 137, in the event an abnormal condition applies too much force to the arm 131. The lower arm 139 of the lever 134 is provided with a cam roller 141 which engages a cam 142, likewise mounted upon the shaft 18. The arm 139 is engaged by a tension spring 143 to urge the roller 141 against the cam 142, and to urge the head 114 to the right as viewed in Figure 6. The cam 142 is formed to oscillate the arm 131 and thus reciprocate member 114 to feed the ribbon 111 forwardly at regularly timed intervals, and for predetermined increments. Each increment of movement is sufficient to form a post from the ribbon, plus a slight excess, and such movements are timed with the feed movements of the blank card, as will be presently described. The feed increments can be accurately controlled by the setting of a screw 144, one end of which forms a stop to limit movement of head 114 to the right as viewed in Figure 6.

It is desirable to provide a type of control which will enable disabling the feed means 112, thus interrupting forward feeding of the ribbon. For this purpose a plate 146 (Figure 4) overlies the feed device just described, and one end of the same is pivotally attached to the frame plate 17 by the pivot pin 147. The free end of plate 146 is loosely attached to the operating rod 148 of a suitable solenoid, as will be presently described. A compression spring 149 surrounding the rod 148 (Figure 7) normally urges the plate 146 to a raised and disengaged position. When the plate 146 is swung downwardly, its lower face is adapted to engage a roller 151 carried by the dog 118. Thus the dog is rotated in a clockwise direction as viewed in Figure 6, to disengage the same from gripping relation with the ribbon. Member 114 is now free to reciprocate without causing corresponding advancing movements of the ribbon.

Figure 16:
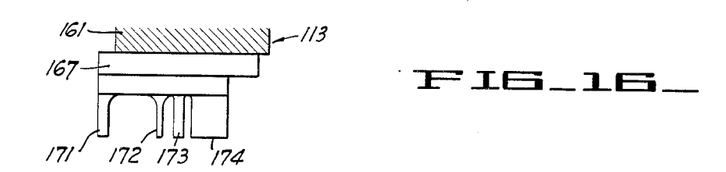
Figures 16 and 17 are side and plan views respectively, schematically illustrating the multiple element punch and the corresponding apertures in the associated die.
Figure 17:
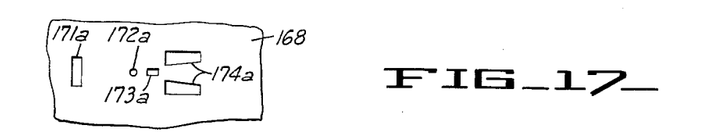

The punch and die assembly 113 (Figures 6 and 7) consists of an operating head 161, which is attached to the upper ends of the vertical reciprocating rods 162. The lower ends of these rods are cross connected by the bar 163, which is pivotally attached to the upper end of the eccentric arms 164. The lower end of the eccentric arms 164 is journaled to the eccentrics 166, which in turn are rigidly attached to the shaft 18. The head 161 serves to mount a multiple element punch 167, and below this punch there is a complementary die 168. Immediately overlying the die 168 there is a stripper 169, which provides a guideway for receiving the ribbon 111. The various elements (Figure 16) 171, 172, 173 and 174 (two elements 174) cooperate with complementary openings (Fig. 17) 171a, 172a, 173a and 174a, in the die. The functioning of the various punch elements will be subsequently described in greater detail, but it may be pointed out that element 171 performs a cut-off function, element 172 punches a small wire receiving opening in the post, element 173 forms a slot in the post, and elements 174 serve to contour a bayonet-like tapered end portion for the post, and which is thrust through an opening in the card.

Figure 11:
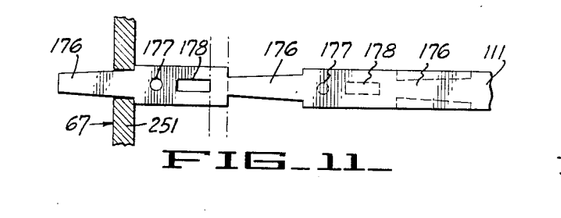
Figure 11 is a detail showing one end of the ribbon stock and illustrating the manner in which the punch and die assembly contours a tab from the same.
Figure 12:
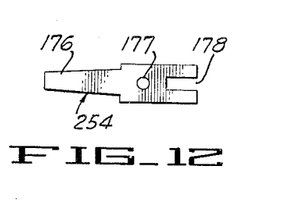
Figure 12 is a view like Figure 11 showing a tab after the same has been severed from the ribbon stock.

The punch and die assembly described above requires more than one position of the metal ribbon to form a complete severed post. Operation of the punch and die assembly can be better understood by reference to Figures 11, 12, 16 and 17. In Figure 11 it is assumed that an end portion of the ribbon has been fed into the punch and die assembly, that preceding punching operations have been carried out, and that the ribbon has just been advanced to a position in readiness for another punching operation. In preceding operations the punch elements 174 have punched away sides of the metal stock to provide the tapered portions 176, and elements 172 and 173 have formed the post opening 177 and the slot 178. In the next punching operation element 171 severs the end of the tapered portion 176 from the preceding post, and elements 172, 173 and 174 again perform their post forming operations. The severing operation necessarily involves the cutting away of a small waste slug. In advancing the ribbon between the punching operations the tapered end portion 176 of the end of the ribbon is thrust into an aligned opening of card 67 as illustrated in Fig. 11, and as will presently be described in greater detail.

In the foregoing description it is made clear that in conjunction with step-by-step feeding of the metal ribbon, the forward bayonet-like end portion 176 of a formed post is thrust into an aperture of the blank card 67. The length of the portion 176 is such that a part projects beyond the rear face of the card 67, and means is provided for crimping and upsetting this projecting part. This crimping means is illustrated particularly in Figure 2. It consists of a pair of levers 181 which are carried by the parallel pivot pins 182, and which have forward nose-like end portions, one of which has a notch 183 and the other a V-shaped element 184. The rear extremities of the levers 181 are shaped to provide cam surfaces which cooperate with the wedge-like cam member 186. This member is pivotally carried by the upper end of a lever 187, which is carried by pivot 188 provided by the adjustable support 189. The lower arm of lever 187 is connected by link 191 with the cam lever 192. A roller 193 mounted upon cam lever 192 engages a cam 194 which is secured to the shaft 18. A tension spring 195 urges the lever 187 in a counterclockwise direction. A tension spring 196 urges the forward nose-like end portions of the levers 181 apart.

In conjunction with the crimping means, means is provided to deliver a hammer-like blow upon the crimped part of the lug. This means includes a weighted arm 197, which has its lower end pivoted at 198 to the base plate 10. Its upper end carries a hammer-like member 199, which is adapted to operate between the levers 181. Arm 197 is provided with a cam shoulder 201, which is adapted to engage the cam 202 mounted upon the shaft 18. The contouring of the cam 202 is such that arm 197 is normally held in the retracted position illustrated in Figure 2, against the tension of the spring 203. Immediately after the crimping operation the arm 197 is released so that it abruptly swings clockwise as viewed in Figure 2 to deliver a blow upon the crimped end part of the lug.

Figure 3:
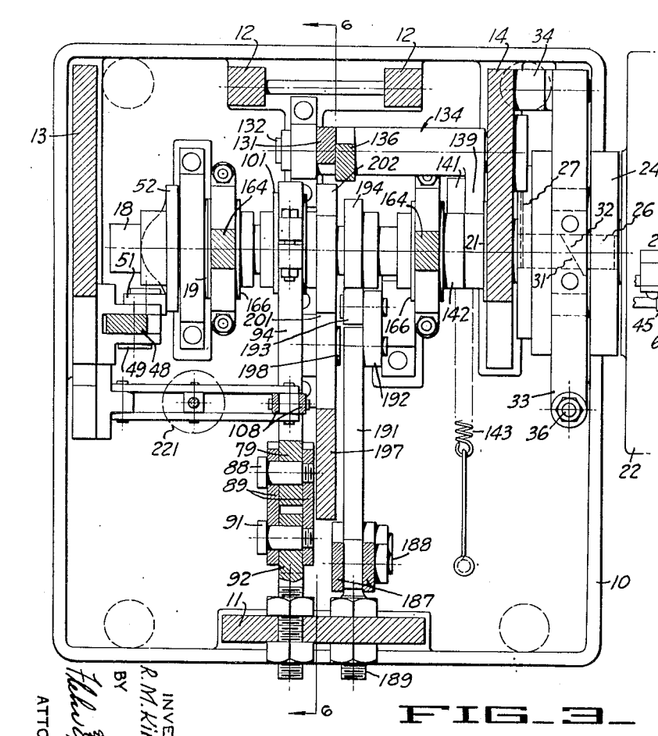
Figure 3 is a cross-sectional view taken along the line 3—3 of Figure 2.

A number of cam elements are supported by the carriage and serve to control starting and stopping of certain operations. Thus cams 211 and 212 are carried by the bracket 58 and cam elements 213 and 214 are carried by the bracket 62. These cam elements have inclined cam faces, and are adapted to engage and operate four switches which are mounted in their respective paths of movement. Thus cam elements 211 and 212 engage respectively the switches 216 and 217 (Fig. 1), and cam elements 213 and 214 are arranged to engage respectively the switches 218 and 219 (Fig. 2). The circuit arrangement for these switches will be presently described in detail. Cam elements 211 and 213 together with the switch 216 serve to control operation of an electrical solenoid 221 (Fig. 3) which in turn actuates the member 107 for positioning the punch elements 102 for selective punching operations near the ends of the blank card. At the beginning of operation of a card, the carriage is in its extreme left hand position, and cam element 211 is in engagement with the switch 216 to close the same and to energize the electrical circuit for the solenoid 221. Therefore the punch element 102 is initially actuated to punch an end hole in the card for mounting purposes, but thereafter as the carriage is fed step-by-step, switch 216 is disengaged, so that the punch element 102 is thereafter rendered inactive. At the end of a series of operations however, cam element 213 engages the switch 218, whereby the punch 102 is again extended to punch an end hole.

Cam element 212 together with the switch 217 controls the feed means for the metal ribbon. The switch 217 is connected with an electrical circuit which energizes a solenoid 222, which is connected to the rod 148 for operating the pivoted plate 146. When the machine is first started in operation the cam element 212 is in engagement with switch 217, whereby the energized solenoid 222 holds plate 146 downwardly, thus disabling the ribbon feeding means. As will be presently explained in greater detail, this insures application of the posts commencing a proper distance from the end of the card, and leaving the first hole unoccupied. Cam element 214 together with switch 219 serves to completely stop the machine after the end of a complete card assembly operation. As will be presently explained the switch 219 is included in an electrical circuit which controls the solenoid (not shown) for operation of the main trip clutch.

Figure 14:
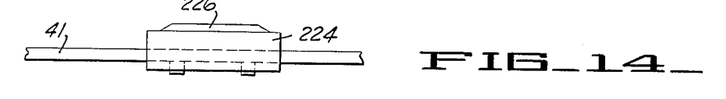
Figures 14 and 15 are fragmentary plan details showing supplemental cam control elements which can be attached to the carriage.
Figure 15:
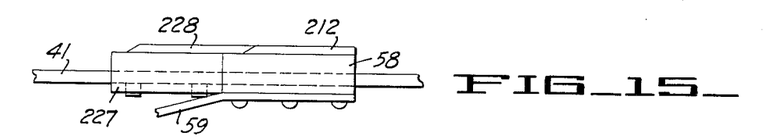

Figures 14 and 15 illustrate additional cam elements which may be used if desired for controlling the post feeding operation. Thus a mounting 224, carrying a cam element 226, can be adjustably applied to the bar 41. Cam element 226 can be arranged to engage the switch 217 during operation of the machine whereby for an intermediate portion of the card blank the ribbon feed is disabled to thereby prevent the application of posts. An additional removable cam mounting 227 can be provided on the bar 41, and its cam element 228 can be arranged to extend the length of cam 212. This arrangement serves to extend the length of an end portion of the card to which posts are not applied.

Figure 4:
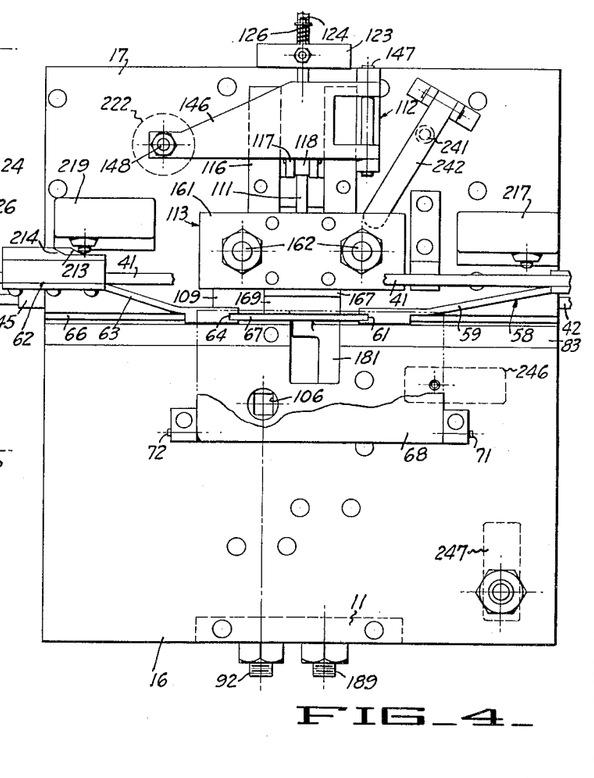
Figure 4 is a plan view of the machine but with portions broken away to facilitate an understanding of the working parts.

Previous reference has been made to the fact that a small waste slug is punched from the ribbon stock, together with side portions of the stock for the contouring of the tapered portion 176. It is desirable in this connection to provide means for positively removing such waste slug portions. For this purpose I provide a member 231 (Figs. 18, 19) which underlies the punching die 168, and which provides an inner cavity 232 of sufficient dimensions to receive the slugs. This cavity is connected with the disposal pipe 233 through which the slugs are discharged. To insure positive ejection of the slugs, suitable air jets are provided. Thus one air supply tube 234 connects with the member 231 and discharges air through a nozzle 236. A second air tube 237 connects with a passage 238 which in turn connects with air jets 239. The nozzle 236 blows the rear slugs into the pipe 233, and jets from the nozzles 239 discharge the forwardly formed slugs into the pipe 233. Tubes 234 and 237 connect together, and with a source of compressed air, through the control valve 241 (Fig. 4). The operating member of this valve is positioned vertically, and is spring pressed upwardly to closed position. A pivoted finger 242 overlies this valve and is periodically depressed by the raising and lowering of the head 161 for the punch and die assembly. Therefore with each punch stroke jets of air are discharged to positively eject the slugs.

Figure 18:
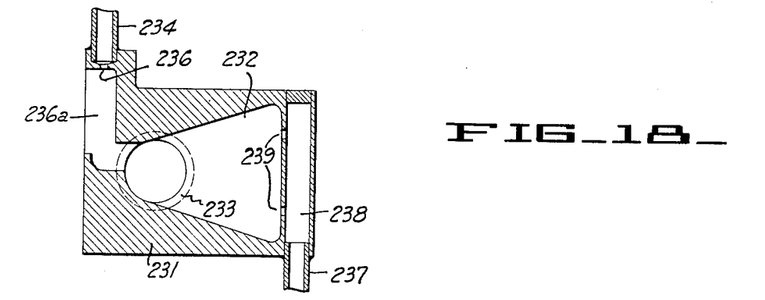
Figures 18 and 19 are sectional and side elevational details showing the means employed for ejecting the slugs.
Figure 19:
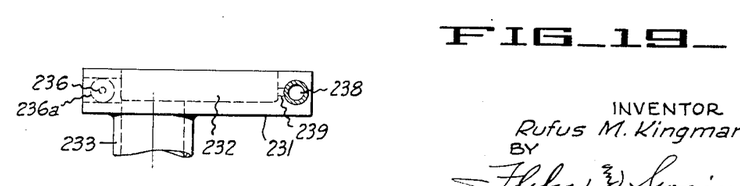

Slugs punched from the mounting card fall into space 236a and are blown by the jet from pipe 234 into pipe 233.

It is desirable to provide certain control switches in addition to those previously mentioned. Thus a switch 246 is provided (Fig. 4) with its operating member disposed to be operated when the plate 68 is swung down to its operating position. When so operated the contacts of switch 246 are closed. This is a safety switch connected with the main circuit of the machine whereby when this switch 246 is not closed, the machine cannot be operated. Another switch 247 is mounted in a convenient location at the front of the machine, and is adapted to be held down manually while the machine is in operation. The operation of this switch initiates the commencement of a card assembly operation, and the machine continues to function automatically while this switch is held down.

Figure 9:
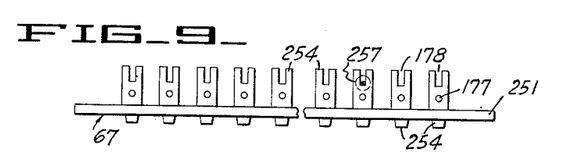
Figure 9 is a side view of the terminal card shown in Figure 8.
Figure 10:
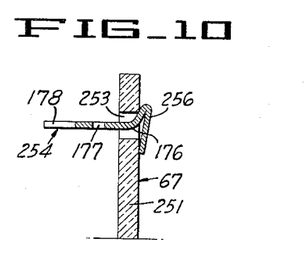
Figure 10 is an enlarged cross-sectional detail taken along the line 10—10 of Figure 8.

Before describing the operation of the machine in entirety, I will describe a typical type of card assembly which is made. Thus referring to Figures 8 to 10 inclusive, the assembly in this instance consists of a rectangularly shaped card 251 formed of suitable insulating material, such as a phenolic condensate product having fiber reinforcing. The end corners of the card are provided with openings 252 of a suitable size to facilitate its attachment to the chassis or other frame part of electronic equipment. Between the holes 252 there are two parallel rows of holes 253, which serve to mount the metal posts 254. The tapered shank portion 176 of each post, which extends through the associated hole 253, has a relatively tight fit, so that the engagement between its edges and the sides of the hole serve to retain the post relatively rigidly upon the card. In other words the fit between the tapered portion 176 and its associated hole is sufficiently tight so that the edges of the tapered portion 176 press into (i. e., indent) the material forming the card, thus forming a secure interlock. That part 256 of the tapered portion 176, which extends beyond the back side of the card (Fig. 10) is doubled upon itself to further insure retention of the post upon the card, and particularly to prevent a post from being pulled free of the card, should retraction force be applied to the same. Each post is also provided with an open-ended slot 178 previously described by reference to Figure 11, and with a wire receiving opening 177. The posts of each row are in a common plane, whereby the slot and the hole in one post are aligned with the slot and hole of an opposite post in the other row.

Figure 8:
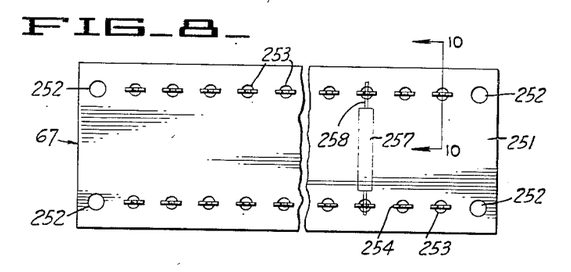
Figure 8 is a plan view of a card assembly incorporating the present invention, and made by the use of my machine.

Figure 8 illustrates the manner in which the posts can be used for the mounting of resistors and condensers. Thus the resistor 257 (shown in dotted lines) has its end terminal wires 258 inserted in two aligned slots 178 and then by a simple soldering operation, the slots have been filled with solder metal to provide a good conductive connection and firmly hold the wires. Circuit connecting wires can be connected to the tabs by introduction of the same into the openings 177, after which a soldering operation makes a secure attachment with good conductive connection.

Figure 13:
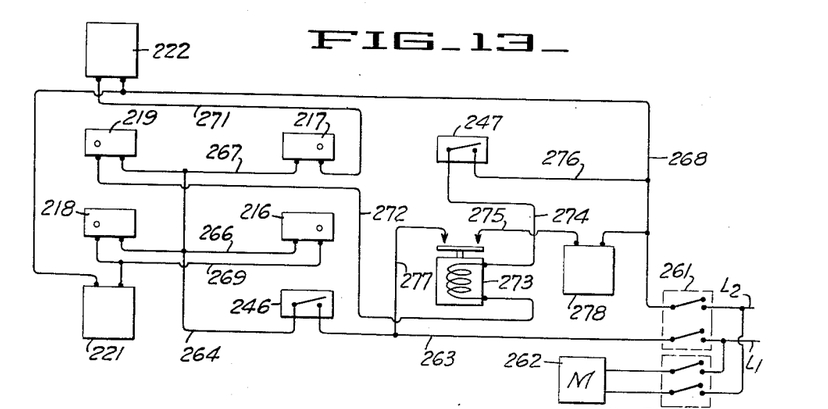
Figure 13 is a schematic view illustrating the manner in which the various electrical parts of the machine are connected.

Figure 13 illustrates a circuit diagram for connecting the various solenoid switches. The current supply lines L-1 and L-2 are adapted to connect by line switch 261 with an electrical circuit including the various switches and solenoids previously mentioned, and the electrical driving motor 262. Conductor 263 connects from line L-1 to one side of the switch 246, which is the so-called safety switch, and the other side of this switch is connected by conductor 264 to conductors 266 and 267, which connect to one terminal of each of the switches 216, 217, 218 and 219. Conductor 268 connects to the other current supply line L-2, and leads to one terminal of each of the solenoids 221 and 222. As previously stated solenoid 221 controls the punching means for punching mounting holes in the ends of the card, while solenoid 222 controls the ribbon feed means. One terminal of each of the switches 216 and 218 are connected together by conductor 269, and to the other terminal of solenoid 221. Conductor 271 connects the other terminal of solenoid 222 with one terminal of the switch 217. Switches 217 and 219 are connected in series, and a terminal switch 219 is connected by conductor 272 to one terminal of the winding of relay 273. The other terminal of the relay winding is connected by conductors 274 and 276 to the conductor 268, in series with switch 247. This is the manual hold-down switch previously mentioned. One contact of the relay 273 is connected by conductor 277 with conductor 263. The other contact of this relay is connected to the conductor 275, in series with a solenoid 278. This is a solenoid which when energized operates the main one revolution clutch of the machine.

Two switches 216 and 218 are normally open, but when engaged by associated cam elements, they are closed. Switch 217 is normally open, but when engaged by a cooperating cam element it is closed. Switch 219 is normally closed but when engaged by a cooperating cam element, it is opened.

It will be evident from the circuit diagram described above that when switch 261 is closed, the motor 262 is energized. Assuming that safety switch 246 is closed together with the stop switch 219, manual closing of the switch 247 serves to energize the winding of relay 273, to close its contacts. This serves to energize the solenoid 278, which releases the main drive clutch of the machine to commence a one revolution rotation of the main drive shaft. Assuming that the operator holds switch 247 closed, the drive shaft will be driven continuously, and the clutch will not be tripped except upon operation of either switches 219 or 246, to open the circuit to the relay 273. Initial retention of switch 216 closed completes a circuit to energize the solenoid 221, in order to secure an initial formation of an end hole 252. Initial retention of switch 217 closed causes solenoid 222 to be energized to disable the ribbon feed. After an initial punching operation to form an end hole 252, with simultaneous disabling of the ribbon feed means, cam 211 disengages itself from switch 216, and thereafter successive punching operations take place to form the holes 253. After the second punching operation cam 212 is disengaged from switch 217 to start forward feeding of the metal ribbon. In conjunction with successive punching operations, the ribbon is fed forward through the punch and die assembly to successively form the posts, and to thrust these lugs into the holes 253. When the end of the card has been reached, cam element 213 engages the switch 218 to again close the same, thereby causing energization of solenoid 221 to again form an end hole 252. Likewise cam element 214 engages the switch 219, to again energize the solenoid 222 and thus disable the ribbon feed means to avoid applying a post in the end hole. Switch 247 can now be released to deenergize the clutch solenoid 278 and arrest further rotation of the main shaft 18.

The mode of operation of my machine can now be summarized as follows: The pawl 47 is manually disengaged from the ratchet teeth 46 on bar 42, and the carriage is moved to its extreme left hand position as viewed in Figure 1. This brings the carriage against a fixed stop, with the cam elements 211 and 212 in engagement with the switches 216 and 217. The plate 68 is swung upwardly by releasing the lock finger 74, and then a card 67 is inserted, with its ends in engagement with the grooves 61 and 64, its lower end with the recess 66, and in a vetrical position as illustrated in Figure 2. Plate 68 is now swung down to horizontal position and the finger 74 locked. This serves to close the normally open safety switch 246. Assuming that the ribbon is in proper position within the punch and die assembly, the operator depresses the hold-down switch 247 to start the machine in automatic operation. As previously explained in connection with the circuit diagram of Figure 13, this serves to energize the main clutch solenoid 278 to release the clutch and to start rotation of the main drive shaft 18. The carriage together with the card blank advances one step. Since the solenoid 221 is initially energized because of engagement of cam 211 with the switch 216, the punch is extended by the raising of the member 107, and therefore a hole 252 of proper size is first punched in the end of the card. During this first revolution of shaft 18 the feed means for the metal ribbon is disabled due to energization of the solenoid 222.

In the second revolution of the shaft 18, the carriage is advanced a second step, but no hole is punched, because punch 81 as it is projected merely passes through the hole made by the punch 102 in the first revolution. Likewise the feed means for the metal ribbon remains disabled. In the third revolution of the shaft 18 the carriage is advanced another step and the punch 81 forms the first opening 253. The feed means for the metal ribbon continues to remain disabled.

In the fourth revolution of the shaft 18, the carriage has advanced one step, and the second hole 253 is punched. The ribbon feed is placed in operation, together with the punch and die assembly. The first post is thrust into the first opening 252, in the manner previously described, and immediately after this post has been forced into its final position, that part of the same projecting from the rear side of the card is engaged by the crimping levers 171 to crimp the same, after which the crimped part is struck a blow by the hammer 199 to completely upset the same to the form illustrated in Figure 10. While these operations are taking place during the fourth revolution, the punch 81 is punching the next hole 253. The cycle just described is then repeated for application of a complete row of posts.

If a cam 228 (Fig. 15) should be mounted upon the carriage, its engagement with switch 219 serves to disable the ribbon feed means for the length of this cam, thus causing an omission of posts for a like length of the card.

Final control is taken by cams 213 and 214 to arrest operation of the machine. In the next to the last revolution of the shaft 18, the carriage advances, the part 102 is operated by cam 213 to punch the last post hole 253 and mounting hole 252 simultaneously, and to apply the next to the last post. In the last revolution, the carriage advances a final step, both punches operate but they do not punch any holes in the card because punch 81 merely passes through the hole 252 previously formed by punch 102. Punch 102 clears the end of the card in its stroke. Cam 214 opens the relay circuit whereby cams 31 and 32 of the clutch engage at the end of the cycle and stop the machine. Likewise in this last revolution the last post is applied to the last hole 253. The operator now releases the hold-down switch 247, and after unlocking and swinging back the plate 68, the partially finished card is removed. The card is now inverted, reinserted in the machine, and the machine operated as previously described to apply lugs and end mounting holes 252 to the other edge of the card.

I claim:

1. In a machine for forming a card and metal terminal post assembly, a punch and die stamping means, means for feeding a metal ribbon to the assembly step-by-step, said stamping means including means forming a post from an end portion of the ribbon and also means serving to sever the formed post from the ribbon, a carriage serving to mount a card, means for advancing the carriage step-by-step across the path of feed of the ribbon, and means for intermittently forming openings in the card, said carriage advancing means serving to move the card to successively bring the openings into alignment with the ribbon to thereby cause the advancing end of a formed post to be thrust through an aligned opening.

2. A machine as in claim 1 in which means is provided for upsetting that portion of the post which projects beyond the back face of the card.

3. A machine as in claim 1 together with means for crimping that portion of the post which projects beyond the back face of the card, and means for upsetting the crimped portion to bend the same in close proximity with the back side of the card.

4. A machine for forming a card and metal terminal post assembly, a punch and die stamping means, means for feeding a ribbon to the assembly step-by-step, the punch and die stamping means including means serving to form a post from a portion of the ribbon and also means serving to sever a formed post from the ribbon, a carriage serving to mount a card, step-by-step carriage advance means to move said card across the line of feed of the ribbon, punching means for intermittently forming holes in the card at regularly spaced intervals, said carriage advance means serving to move the card to successively bring the holes into alignment with the ribbon to thereby cause the advancing end of a formed post to be thrust through an aligned opening by said ribbon feeding means, means for crimping that portion of the post which projects beyond the back face of the card, means for upsetting said crimped portion of the post to thereby bend the same into close proximity with the back face of the card, means for successively actuating said crimping and upsetting means in synchronism with movements of the card and with actuation of said punch and die means.

5. A machine as in claim 4 together with supplemental punching means serving to form openings in the end portions of the card, and means for actuating said supplemental punching means.

6. In a machine for forming a card and electrical terminal post assembly, a punch and die stamping means, means for feeding a metal ribbon to the assembly, step-by-step, the punch and die stamping means including means serving to form successive metal posts from the ribbon and also means serving to sever the formed posts, each post having an advancing tapered bayonet-like portion, a carriage serving to mount a card, step-by-step carriage advance means for movement of said card across the path of feed of the ribbon, means for forming openings in the card to provide regularly spaced openings, said carriage advance means serving to move the card to successively bring the openings into alignment with the ribbon to thereby cause the advancing tapered end of a formed post to be thrust by said ribbon feeding means through an aligned opening in the card, means for upsetting that portion of the bayonet portion which projects beyond the rear face of the card, and means for actuating said upsetting means in synchronism with feeding movements of the card and ribbon.

7. In a machine for forming a card and electrical terminal post assembly, punch and die means, means for feeding a metal ribbon to the punch and die means step-by-step, means for operating the punch and die means, said punch and die means including means serving to form posts from said ribbon successively and permitting said feed means to thrust a portion of each post through an opening in the card, with a part of said post portion projecting beyond the rear face of the card, crimping means for crimping said part of the post, hammer-like means for upsetting said crimped part to cause the same to be doubled upon itself and bent into proximity with the back side of the card, and means for successively actuating said crimping and hammer-like means in synchronism with said feed means.

8. In a machine for forming a card and metal terminal post assembly, a carriage serving to support a card, means serving to advance the carriage step by step into the machine, means for feeding a metal ribbon step by step to the machine, means for successively punching spaced holes in the card, means for actuating said punching means in synchronism with said feeding movements of the carriage, means for forming posts from said ribbon, means for thrusting the posts into the openings of the card, and means for upsetting that portion of the post extending beyond the back side of the card.

RUFUS M. KINGMAN.

References Cited in the file of this patent

UNITED STATES PATENTS

| Number | Name | Date |
|---|---|---|
| 1,885,477 | Potter | Nov. 1, 1932 |
| 1,997,198 | Ogg | Apr. 9, 1935 |
| 2,023,517 | Creager | Dec. 10, 1935 |
| 2,073,466 | Del Camp | Mar. 9, 1937 |
| 2,251,434 | Weiss | Aug. 5, 1941 |
| 2,252,202 | Ralston | Aug. 12, 1942 |
| 2,302,075 | Ulrich | Nov. 17, 1942 |
| 2,333,966 | Weiss | Nov. 9, 1943 |
| 2,394,837 | Bartelheim | Feb. 12, 1946 |
| 2,436,756 | Larkin | Feb. 24, 1948 |
| 2,438,959 | Bartelheim | Apr. 6, 1948 |
| 2,441,181 | Bartelheim | May 11, 1948 |